(12) United States Patent
Koyama et al.

(10) Patent No.: US 11,053,386 B2
(45) Date of Patent: Jul. 6, 2021

(54) POLY(3-HYDROXYALKANOATE) RESIN COMPOSITION (71) Applicant: KANEKA CORPORATION, Osaka (JP)

(72) Inventors: Ryohei Koyama, Settsu (JP); Tetsuo Okura, Settsu (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 16/740,572

(22) Filed: Jan. 13, 2020

(65) Prior Publication Data
US 2020/0181397 A1 Jun. 11, 2020

Related U.S. Application Data (63) Continuation of application No. PCT/JP2018/027505, filed on Jul. 23, 2018.

(30) Foreign Application Priority Data

Jul. 24, 2017 (JP) .............................. JP2017-142520

(51) Int. Cl.
| | |
|---|---|
| *C08L 67/04* | (2006.01) |
| *B29C 49/00* | (2006.01) |
| *C08K 5/11* | (2006.01) |
| *C08K 5/14* | (2006.01) |
| *C08K 5/1535* | (2006.01) |
| *C08J 3/24* | (2006.01) |
| *C08K 5/10* | (2006.01) |
| *B29K 67/00* | (2006.01) |
| *C08L 101/16* | (2006.01) |

(52) U.S. Cl.
CPC .......... *C08L 67/04* (2013.01); *B29C 49/0005* (2013.01); *B29C 49/0047* (2013.01); *C08J 3/24* (2013.01); *C08K 5/10* (2013.01); *C08K 5/11* (2013.01); *C08K 5/14* (2013.01); *C08K 5/1535* (2013.01); *B29K 2067/04* (2013.01); *C08L 101/16* (2013.01); *C08L 2203/16* (2013.01)

(58) Field of Classification Search
None
See application file for complete search history.

(56) References Cited

U.S. PATENT DOCUMENTS 6,201,083 B1   3/2001   Asrar et al.

FOREIGN PATENT DOCUMENTS

WO    WO-2010118041 A1 * 10/2010 ............. C08J 3/203

OTHER PUBLICATIONS

Rienke, et al., "Effect of Shear Rate Variation on Apparent Viscosity of Human Blood in Tubes of 29 to 94 microns in Diameter", Circulation Research, vol. 59, No. 2, p. 124-132, Aug. 1986. (Year: 1986).*
International Search Report dated Oct. 9, 2018 in PCT/JP2018/027505 filed Jul. 23, 2018, 1 page.

* cited by examiner

*Primary Examiner* — Christopher M Rodd
(74) *Attorney, Agent, or Firm* — Oblon, McClelland, Maier & Neustadt, L.L.P.

(57) ABSTRACT

Provided are a resin composition containing poly(3-hydroxyalkanoate), the resin composition enabling a film or a sheet to be stably produced under practical processing conditions by inflation molding; and a method for producing the resin composition. The resin composition includes 100 parts by weight of poly(3-hydroxyalkanoate) and 5 to 15 parts by weight of an ester compound, and having a ratio of $3.5 \times 10^{-2}$ to $4.8 \times 10^{-2}$ (sec/[Pa·s]) between a melt viscosity (Pa·s) and a drawdown time (sec).

16 Claims, 1 Drawing Sheet

POLY(3-HYDROXYALKANOATE) RESIN COMPOSITION

CROSS-REFERENCE TO RELATED APPLICATIONS

This application is a continuation of International Application No. PCT/JP2018/027505, filed on Jul. 23, 2018, and claims priority to Japanese Application Number 2017-142520, filed on Jul. 24, 2017, the disclosures of which are incorporated herein by reference in their entireties.

TECHNICAL FIELD

The present invention relates to a resin composition containing poly(3-hydroxyalkanoate), and a method for producing the resin composition.

BACKGROUND ART

In recent years, there has arisen the problem that plastic waste heavily affects the global environment by impacts on the ecosystems, generation of harmful gases during combustion, global warming caused by an enormous amount of heat in combustion, and the like, and development of biodegradable plastics has become active as a solution to the problem. In particular, biodegradable plastics which are produced from plant-derived raw materials do not cause an increase in the amount of carbon dioxide in the atmosphere because carbon dioxide generated in combustion of the biodegradable plastics originates in the air. This concept is called carbon neutrality, and is considered important and encouraged to be positively accepted under the Kyoto Protocol in which carbon dioxide reduction targets are specified.

Recently, in the context of biodegradability and carbon neutrality, attention has been paid to biodegradable aliphatic polyester resins as plant-derived plastics, and in particular, polyhydroxyalkanoate-based resins (hereinafter, sometimes referred to as PHA) have been attracted attention. Among PHA-based resins, poly(3-hydroxyalkanoate) resins (sometimes referred to as P3HA) such as poly(3-hydroxybutyrate) homopolymer resins (sometimes referred to as P3HB), poly(3-hydroxybutyrate-co-3-hydroxy valerate) copolymer resins (sometimes referred to as P3HB3HV), poly(3-hydroxybutyrate-co-3-hydroxyhexanoate) copolymer resins (sometimes referred to as P3HB3HH), poly(3-hydroxybutyrate-co-4-hydroxybutyrate) copolymer resins (sometimes referred to as P3HB4HB) have attracted attention.

In general, P3HA, particularly copolymer P3HA is apt to be thermally decomposed, and is poor in processability in melt molding, and molded articles obtained from P3HA have insufficient physical properties. Attempts have been made to solve these problems (see, for example, Patent Literature 1).

CITATION LIST

Patent Literature

PTL 1: U.S. Pat. No. 6,201,083

SUMMARY OF INVENTION

Technical Problem

However, in conventional methods, it is still impossible to produce a film or sheet, which is a particularly thin molded article, by inflation molding. For example, it has been found that in the method described in Patent Literature 1, there is substantially no condition selectable for stably performing inflation molding (see, for example, comparative examples in the present application).

Thus, an object of the present invention is to provide a resin composition containing poly(3-hydroxyalkanoate), the resin composition enabling a film or a sheet to be stably produced under practical processing conditions by inflation molding; and a method for producing the resin composition.

Solution to Problem

The present inventors have extensively conducted studies for solving the above-described problems, and resultantly found that with a resin composition containing poly(3-hydroxyalkanoate) and an ester compound and having an apparent melt viscosity and a drawdown time controlled to have a specific relationship, a film or a sheet can be stably produced under practical processing conditions by inflation molding, leading to completion of the present invention.

Specifically, the present invention provides, for example, the following inventions.

[1] A resin composition including 100 parts by weight of poly(3-hydroxyalkanoate) and 5 to 15 parts by weight of an ester compound, and having a ratio of $3.5 \times 10^{-2}$ to $4.8 \times 10^{-2}$ (sec/[Pa·s]) between a melt viscosity (Pa·s) and a drawdown time (sec), the melt viscosity being an apparent melt viscosity ($\eta$) calculated from the following formula (1) where F is a load measured with a capillary rheometer in extrusion of the resin composition molten at a volume flow rate (Q) of 0.716 cm$^3$/min and a shear rate of 122 sec$^{-1}$ from an orifice having a radius (d) of 0.05 cm and a capillary length (l) of 1 cm and connected to the tip of a barrel having a barrel set temperature of 170° C. and a radius (D) of 0.4775 cm, the drawdown time being a time required for the resin composition to fall by 20 cm after being discharged from the orifice in measurement of the melt viscosity.

[Mathematical Formula 1]

$$\eta = \frac{\pi(F/\pi D^2)d^4}{8Ql} \qquad \text{(Formula 1)}$$

[2] The resin composition described in [1], in which the melt viscosity is 800 to 1600 (Pa·s).

[3] The resin composition described in [1] or [2], in which the drawdown time is 30 to 60 (sec).

[4] A resin composition obtained by melting and kneading 100 parts by weight of poly(3-hydroxyalkanoate), 0.01 to 0.6 parts by weight of an organic peroxide and 5 to 15 parts by weight of an ester compound in an extruder.

[5] The resin composition described in any one of [1] to [4], in which the ester compound is an ester compound having no radical-reactive functional group.

[6] The resin composition described in any one of [1] to [5], in which the poly(3-hydroxyalkanoate) is at least one selected from the group consisting of poly(3-hydroxybutyrate-co-3-hydroxyvalerate), poly(3-hydroxybutyrate-co-3-hydroxyhexanoate,poly(3-hydroxybutyrate-co-3-hydroxyvalerate-co-3-hydroxyhexanoate), poly(3-hydroxybutyrate-co-4-hydroxybutyrate), poly(3-hydroxybutyrate-co-3-hydroxyoctanoate) and poly(3-hydroxybutyrate-co-3-hydroxydecanoate).

[7] The resin composition described in any one of [1] to [6], in which the ester compound is at least one selected from the group consisting of a glycerin ester-based compound, a dibasic acid ester-based compound, an adipate ester-based compound, a polyether ester-based compound and an isosorbide ester-based compound.

[8] The resin composition described in any one of [1] to [7], in which the resin composition is used for inflation molding.

[9] A molded article obtained by molding the resin composition described in any one of [1] to [8].

[10] The molded article described in [9], in which the molded article is a film or a sheet.

[11] The molded article described in [9], in which the molded article is a film having a thickness of 30 µm or less.

[12] A method for producing a resin composition, including the step of melting and kneading 100 parts by weight of poly(3-hydroxyalkanoate), 5 to 15 parts by weight of an ester compound having no radical-reactive functional group and 0.01 to 0.6 parts by weight of an organic peroxide at a resin temperature of 155° C. to 175° C.

[13] The method for producing a resin composition as described in [12], in which the melt-kneading is performed so as to retain the mixture in an extruder for 60 seconds to 300 seconds.

[14] A method for producing a film or a sheet, including the step of forming a film or a sheet by subjecting the resin composition described in any one of [1] to [7] to inflation molding.

Advantageous Effects of Invention

Since the present invention has the above-described configuration, a film or a sheet can be stably produced under practical processing conditions by inflation molding although poly(3-hydroxyalkanoate) having a narrower processing temperature range, lower productivity and poorer inflation moldability as compared to general-purpose resins is present.

DESCRIPTION OF EMBODIMENTS

Figure 1:
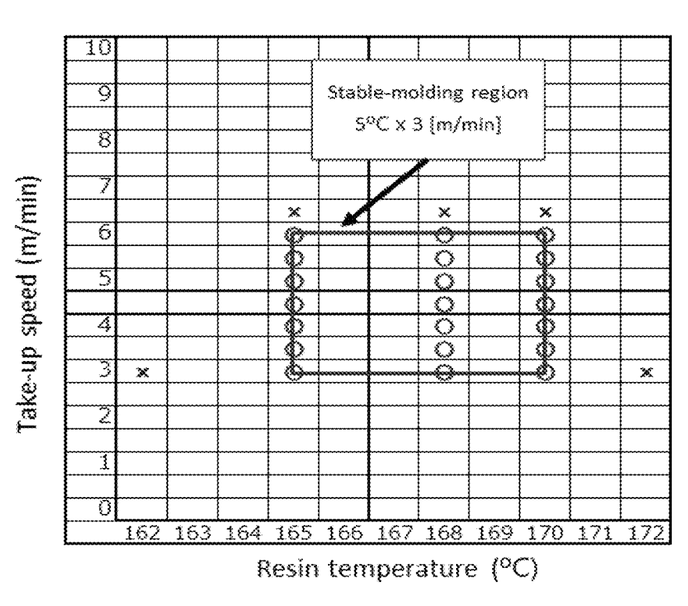
The FIGURE is a graph showing an example of a stable-molding region (° Cm/min) and a method for calculation thereof [ordinate: take-up speed (m/min) and abscissa: resin temperature (° C.)].

The resin composition of the present invention is a resin composition containing 100 parts by weight of poly(3-hydroxyalkanoate) and 5 to 15 parts by weight of an ester compound as essential components.

[Poly(3-hydroxyalkanoate) (P3HA)]

The poly(3-hydroxyalkanoate) in the resin composition of the present invention is polyhydroxyalkanoate which is aliphatic polyester having biodegradability (preferably a polyester which does not contain an aromatic ring), and contains 3-hydroxyalkanoate repeating units represented by the general formula [—CHR—CH$_2$—CO—O-] (wherein R is an alkyl group represented by C$_n$H$_{2n+1}$, n is an integer of 1 or more and 15 or less) as essential repeating units. In particular, the ratio of the repeating units to all monomer repeating units (100 mol %) is preferably 50 mol % or more, more preferably 70 mol % or more. More specifically, examples of P3HA include poly(3-hydroxybutyrate) (P3HB), poly(3-hydroxybutyrate-co-3-hydroxyvalerate) (P3HB3HV), poly(3-hydroxybutyrate-co-3-hydroxyhexanoate) (P3HB3HH), poly(3-hydroxybutyrate-co-3-hydroxyvalerate-co-3-hydroxyhexanoate) (P3HB3HV3HH), poly (3-hydroxybutyrate-co-4-hydroxybutyrate) (P3HB4HB), poly (3-hydroxybutyrate-co-3-hydroxyoctanoate) and poly(3-hydroxybutyrate-co-3-hydroxydecanoate).

P3HA produced by microorganisms (microbiologically produced P3HA) is usually P3HA composed only of polyhydroxyalkanoate monomer units of D-form (R-form). The microbiologically produced P3HA is preferably P3HB, P3HB3HH, P3HB3HV, P3HB3HV3HH or P3HB4HB from the viewpoint of ease of industrial production, more preferably P3HB, P3HB3HH, P3HB3HV or P3HB4HB.

When P3HA (particularly microbiologically produced P3HA) contains 3-hydroxybutanoate (3HB) repeating units as essential monomer units, the P3HA has such a monomer composition ratio that the ratio of 3-hydroxybutanoate (3HB) repeating units to all repeating units (100 mol %) is preferably 80 to 99 mol %, more preferably 85 to 97 mol %. When the composition ratio of 3HB repeating units is 80 mol % or more, the rigidity of P3HA is further improved, and the degree of crystallinity is not excessively low, which tends to facilitate purification. On the other hand, when the composition ratio of 3HB repeating units is 99 mol % or less, flexibility tends to be further improved. The monomer composition ratio of P3HA can be measured by gas chromatography or the like (see, for example, WO 2014/020838).

The microorganism which produces microbiologically produced P3HA is not particularly limited as long as it is a microorganism capable of producing P3HAs. For example, the first P3HB-producing bacterium is *Bacillus megaterium* discovered in 1925, and in addition, natural microorganisms such as *Cupriavidus necator* (former class name: *Alcaligenes eutrophus, Ralstonia eutropha* and *Alcaligenes latus* are known. In these microorganisms, P3HB is accumulated in the cells.

Further, as bacteria producing copolymers of hydroxybutyrate and other hydroxyalkanoates, P3HB3HV and P3HB3HH producing bacteria such as *Aeromonas caviae*, P3HB4HB producing bacteria such as *Alcaligenes eutrophus* and the like are known. In particular, with regard to P3HB3HH, the *Alcaligenes eutrophus* AC32 strain (*Alcaligenes eutrophus* AC32, FERM BP-6038) into which a P3HA synthetase group gene has been introduced in order to enhance the productivity of P3HB3HH (T. Fukui, Y Doi, J. Bateriol, 179, p 4821-4830 (1997)) and the like are more preferable, and microbial cells obtained by culturing these microorganisms under appropriate conditions to accumulate P3HB3HH in the cells are used. Besides the above-described microorganisms, genetically modified microorganisms into which various P3HA synthesis-related genes have been introduced may be used in conformity to P3HA to be produced, or culture conditions including the type of substrate may be optimized.

The molecular weight of P3HA is not particularly limited as long as it exhibits substantially sufficient physical properties in the intended application, and the weight average molecular weight of the polyester (A) is preferably 50,000 to 3,000,000, more preferably 100,000 to 1,000,000, still more preferably 300,000 to 700,000. When the weight average molecular weight is 50,000 or more, the strength of the film tends to be further improved. On the other hand, when the weight average molecular weight is 3,000,000 or less, processability tends to be further improved, leading to easier molding. The P3HA is preferably P3HA uniformly and moderately crosslinked as described later, and the numerical value of the weight average molecular weight is a value measured before crosslinking P3HA.

The weight average molecular weight of P3HA after crosslinking is preferably 50,000 to 3,000,000, more preferably 100,000 to 1,000,000, and still more preferably 300,000 to 700,000. When the weight average molecular weight is 50,000 or more, the strength of the film tends to be further improved. On the other hand, when the weight average molecular weight is 3,000,000 or less, processability tends to be further improved, leading to easier molding.

In the method for measuring the weight average molecular weight, a gel permeation chromatograph (GPC) ("Shodex GPC-101" manufactured by Showa Denko K.K.) is used, a polystyrene gel ("Shodex K-804" manufactured by Showa Denko K.K.) is used as a column, chloroform is used as a mobile phase, and a molecular weight in terms of polystyrene is determined. Here, a calibration curve is prepared using polystyrene having a weight average molecular weight of 31,400, 197,000, 668,000 and 1,920,000. As a column in the GPC, a column suitable for measuring the molecular weight may be used.

In the resin composition of the present invention, P3HA can be used alone, or two or more fatty acid amides (B) can be used in combination.

The content of P3HA in the resin composition of the present invention is not particularly limited, but is preferably 20% by weight or more, more preferably 30% by weight or more, still more preferably 40% by weight or more, still more preferably 60% by weight or more, still more preferably it is 70% by weight or more. When the content of P3HA is 20% by weight or more, the biodegradability of the resin composition tends to be further improved. The upper limit of the content of P3HA is not particularly limited, but is preferably 95% by weight or less, more preferably 92% by weight or less, still more preferably 90% by weight or less.

[Other Resins]

The resin composition of the present invention may contain resins other than P3HA (sometimes referred to as "other resins"). The other resins are not particularly limited as long as compatibility, mold-workability and mechanical properties are not significantly deteriorated in molding of resin composition of the present invention, but biodegradable resins are preferable when the resin composition is used in applications requiring biodegradability which is a characteristic of P3HA. Examples of the other resins include aliphatic polyester having a structure in which an aliphatic diol and an aliphatic dicarboxylic acids are polymerized and condensed, and aliphatic aromatic polyester having both an aliphatic compound and an aromatic compound as monomers. Examples of the former include polyethylene succinate, polybutylene succinate (PBS), polyhexamethylene succinate, polyethylene adipate, polybutylene adipate, polyhexamethylene adipate, polybutylene succinate adipate (PBSA), polyethylene sebacate and polybutylene sebacate. Examples of the latter include poly(butylene adipate-co-butylene terephthalate) (PBAT), poly(butylene sebacate-co-butylene terephthalate), poly(butylene azelate-co-butylene terephthalate) and poly(butylene succinate-co-butylene terephthalate) (PB ST). In addition, the other resins can be used alone, or in combination of two or more thereof.

The content of the other resins in the resin composition of the present invention is not particularly limited, but is preferably 250 parts by weight or less, more preferably 100 parts by weight or less, still more preferably 50 parts by weight or less, especially preferably 20 parts by weight or less with respect to 100 parts by weight of P3HA. The lower limit of the content of the other resins is not particularly limited, and may be 0 parts by weight.

[Ester Compound]

The ester compound in the resin composition of the present invention is a compound having an ester bond in the molecule (excluding P3HA and the other resins described above). Specific examples of the ester compound include modified glycerin-based compounds, dibasic acid ester-based compounds, adipate ester-based compounds, polyether ester-based compounds, benzoate ester-based compounds, citrate-based ester-based compounds, isosorbide ester-based compounds and polycaprolactone-based compounds. Among these compounds, glycerin ester-based compounds, dibasic acid ester-based compounds, adipate ester-based compounds, polyether ester-based compounds and isosorbide ester-based compounds are preferable. In addition, the other ester compounds can be used alone, or in combination of two or more thereof. When two or more ester compounds are used in combination, the mixing ratio of the ester compounds can be appropriately adjusted.

The ester compound is preferably an ester compound having no radical-reactive functional group (e.g. an epoxy group or a carbon-carbon double bond). When an ester compound having a radical-reactive functional group is used, the progress of crosslinking in the resin composition may be promoted more than necessary, thus making it difficult to control the melt viscosity and the melt tension. In this case, the melt viscosity and the melt tension often become too large to stably perform inflation molding. In the present invention, an ester compound having no radical-reactive functional group is used, and thus the range of blending and temperature control is expanded, so that the range of selection of processing conditions enabling inflation molding to be stably performed is widened, leading to simplification of process.

The modified glycerin-based compound is preferably a glycerin ester compound. As the glycerin ester-based compound, any of monoesters, diesters and triesters of glycerin can be used, but from the viewpoint of compatibility with PHA, triesters of glycerin are preferable. Among triesters of glycerin, glycerol diacetomonoesters are especially preferable. Specific examples of glycerol diacetomonoester include glycerol diacetomonolaurate, glycerol diacetomonooleate, glycerol diacetomonostearate, glycerol diacetomonocaprylate and glycerol diacetomonodecanoate. Examples of the modified glycerin-based compound include "RIKEMAL" (registered trademark) PL Series manufactured by Riken Vitamin Co., Ltd.

Examples of the dibasic acid ester-based compound include dibutyl adipate, diisobutyl adipate, bis(2-ethylhexyl) adipate, diisononyl adipate, diisodecyl adipate, bis[2-(2-butoxyethoxy) ethyl] adipate, bis[2-(2-butoxyethoxy)ethyl] adipate, bis(2-ethylhexyl)azelate, dibutyl sebacate, bis(2-ethylhexyl) sebacate, diethyl succinate, and mixed dibasic acid ester compounds.

Examples of the adipate ester-based compound include diethylhexyl adipate, dioctyl adipate and diisononyl adipate.

Examples of polyether ester-based compound include polyethylene glycol dibenzoate, polyethylene glycol dicaprylate, and polyethylene glycol diisostearate.

The ester compound is preferably a modified glycerin-based compound because it is excellent in cost performance and versatility and has a high degree of biomass. In particular, from the viewpoint of compatibility with P3HA, the ester compound is a glycerin triester, more preferably a glycerol diacetomonoester, especially preferably glycerin diacetomonolaurate.

The content of the ester compound in the resin composition of the present invention is 5 to 15 parts by weight, preferably 7 to 12 parts by weight, more preferably 8 to 11 parts by weight based on 100 parts by weight of P3HA. When the content is more than 15 parts by weight, the ester compound may bleed in the molded article of the resin composition, resulting in poor printability and handleability, or it may be impossible to obtain a favorable rheological property in, for example, inflation moldability because the resin composition has an excessively small melt viscosity. On the other hand, when the content is less than 5 parts by weight, production of the resin composition of the present invention using an organic peroxide as describe later tends to be disturbed by the following problem. The organic peroxide has poor dispersibility in P3HA, and thus local degeneration reaction occurs, leading to marked gelation.

[Other Components]

The resin composition of the present invention may contain other components. For example, an organic or inorganic filler and the like can be used as long as the effect of the present invention is not hindered. In particular, from the viewpoint of biodegradability and carbon neutrality of the resulting film, for example, naturally derived materials such as wood-based materials such as wood chips, wood flour and sawdust, rice husk, rice flour, starch, corn starch, rice straw, straw and natural rubber are preferable. The content of the organic or inorganic filler can be appropriately set, and is not particularly limited. One organic or inorganic filler can be used alone, or two or more organic or inorganic fillers can be used in combination.

In addition to the organic or inorganic fillers, one or more of colorants such as pigments and dyes, odor absorbing agents such as activated carbon and zeolite, perfumes such as vanillin and dextrin, oxidation preventing agents, antioxidants, weatherability improvers, UV absorbers, lubricants, mold release agents, water repellents, antibacterial agents, slide improvers and other secondary additives, which are used as usual additives, may be present as long as the effect of the present invention is not hindered. The contents of the additives can be appropriately set.

Here, a "crystal nucleating agent" and a "lubricant" as components of the resin composition of the present invention will now be described in further detail. More specifically, an "external lubricant" will be described as the lubricant.

[Crystal Nucleating Agent]

The resin composition of the present invention may contain a crystal nucleating agent etc. As the crystal nucleating agent, for example, a fatty acid amide, a polyhydric alcohol is preferably used. Examples of the fatty acid amide include behenic acid amide, and examples of the polyhydric alcohol include pentaerythritol, galactitol and mannitol. The crystal nucleating agents can be used alone, or in combination of two or more thereof. The content of the crystal nucleating agent can be appropriately set, and is not particularly limited.

[External Lubricant]

The resin composition of the present invention may contain an external lubricant etc. Examples of the external lubricant include erucic acid amide, palmitic acid amide, oleic acid amide, stearic acid amide, methylenebisstearic acid amide, ethylenebisstearic acid amide, ethylenebisoleic acid amide and ethylenebiserucic acid amide. The external lubricants can be used alone, or in combination of two or more thereof. The content of the external lubricant can be appropriately set, and is not particularly limited.

For example, when produced by a production method using an organic peroxide as described later, the resin composition of the present invention may contain a component derived from the organic peroxide (e.g. a decomposed product of the organic peroxide, a compound derived from the decomposed product, etc.). The organic peroxide will be described later.

The resin composition of the present invention is a resin composition in which a ratio of an apparent melt viscosity (Pa·s) and a drawdown time (sec) as described later (sometimes referred to as a "drawdown time/melt viscosity ratio") is $3.5 \times 10^2$ to $4.8 \times 10^{-2}$ (sec/[Pa·s]). The drawdown time/melt viscosity ratio of the resin composition of the present invention is preferably $4.0 \times 10^{-2}$ to $4.7 \times 10^{-2}$ (sec/[Pa·s]). As long as the drawdown time/melt viscosity ratio of the resin composition of the present invention is controlled to fall within the above-described range, the resin composition has a proper balance between the melt viscosity and the melt tension particularly in inflation molding, and thus a film or a sheet can be stably produced under practical processing conditions by inflation molding. For ensuring that the resin composition containing poly(3-hydroxyalkanoate) has a drawdown time/melt viscosity ratio as described above, the poly(3-hydroxyalkanoate) is preferably uniformly and moderately crosslinked poly(3-hydroxyalkanoate). Such poly(3-hydroxyalkanoate) can be obtained by, for example, a method in which uncrosslinked (linear) poly(3-hydroxyalkanoate) is melted and kneaded together with an ester compound and an organic peroxide as described later.

On the other hand, when poly(3-hydroxyalkanoate) is locally (nonuniformly) crosslinked or excessively crosslinked, the ratio of increase in melt tension to the associated increase in melt viscosity becomes excessively high, and thus the drawdown time/melt viscosity ratio of the resin composition significantly increases and exceeds $4.8 \times 10^{-2}$ (sec/[Pa·s]), so that it is difficult to stably perform inflation molding. On the other hand, when the degree of crosslinking is excessively small, or there is no branched structure resulting from crosslinking, but the melt viscosity is high because of the high molecular weight, the drawdown time/melt viscosity ratio significantly decreases and drops below $3.5 \times 10^{-2}$ (sec/[Pa·s]), so that it is difficult to stably perform inflation molding.

The melt viscosity (apparent melt viscosity) in the drawdown time/melt viscosity ratio of the resin composition of the present invention is defined as follows.

Melt viscosity: an apparent melt viscosity ($\eta$) calculated from the following formula (1) where F is a load measured with a capillary rheometer in extrusion of the resin composition molten at a volume flow rate (Q) of 0.716 cm³/min and a shear rate of 122 sec$^{-1}$ from an orifice having a radius (d) of 0.05 cm and a capillary length (l) of 1 cm and connected to the tip of a barrel having a barrel set temperature of 170° C. and a radius (D) of 0.4775 cm,

[Mathematical Formula 2]

$$\eta = \frac{\pi(F/\pi D^2)d^4}{8Ql} \quad \text{(Formula 1)}$$

The melt viscosity of the resin composition of the present invention is not particularly limited, but is preferably 800 to 1600 (Pa·s), more preferably 900 to 1400 (Pa·s), still more preferably 1000 to 1200 (Pa·s). When the melt viscosity is 800 (Pa·s) or more, a balloon in inflation molding can be stably taken up with a take-up roll, and vibrations with cooling air can be suppressed, so that it tends to be possible to produce a film or sheet having a stable width. On the other hand, when the melt viscosity is 1600 (Pa·s) or less, it tends to be possible to suppress a situation in which a film is tore and broken during blowup in inflation molding. For example, when the resin composition of the present invention is produced by a method as described later, the melt viscosity of the resin composition of the present invention can be preferably controlled to fall within the above-described range by the added amount of the organic peroxide, the added amount of the ester compound, the molecular weight of P3HA and the like.

The drawdown time in the drawdown time/melt viscosity ratio of the resin composition of the present invention is defined as follows.

Drawdown time: a time required for the resin composition to fall by 20 cm after being discharged from the orifice in measurement of the melt viscosity.

The drawdown time of the resin composition of the present invention is not particularly limited, but is preferably 30 to 60 (sec), more preferably 35 to 55 (sec), still more preferably 40 to 50 (sec). When the drawdown time is 30 (sec) or more, it tends to be easy to form and maintain a stable balloon when productivity is enhanced by increasing the take-up speed and the blowup ratio during inflation molding. On the other hand, when the drawdown time is 60 (sec) or less, it tends to be possible to suppress gel generation and associated perforation (film cracking) during inflation molding. For example, when the resin composition of the present invention is produced by a method as described later, the drawdown time of the resin composition of the present invention can be preferably controlled to fall within the above-described range by the added amount of the organic peroxide, the added amount of the ester compound, the molecular weight of P3HA and the like.

<Method for Producing Resin Composition>

The method for producing a resin composition according to the present invention is not particularly limited, and may be, for example, a method including at least the step of melt-kneading 100 parts by weight of poly(3-hydroxyalkanoate), 5 to 15 parts by weight of an ester compound and 0.01 to 0.6 parts by weight of an organic peroxide in an extruder ("melt-kneading step"). With the method, it is possible to obtain a resin composition in which the drawdown time/melt viscosity ratio is controlled to $3.5 \times 10^{-2}$ to $4.8 \times 10^{-2}$ (sec/[Pa·s]). That is, the resin composition of the present invention may be obtained by melting and kneading 100 parts by weight of poly(3-hydroxyalkanoate), 0.01 to 0.6 parts by weight of an organic peroxide and 5 to 15 parts by weight of an ester compound in an extruder.

[Organic Peroxide]

Examples of the organic peroxide to be used in the melt-kneading step include diisobutyl peroxide, cumyl peroxyneodecanoate, di-n-propyl peroxydicarbonate, diisopropyl peroxydicarbonate, di-sec-butyl peroxydicarbonate, 1,1,3,3-tetramethylbutyl peroxyneodecanoate, bis(4-t-butylcyclohexyl) peroxydicarbonate, bis(2-ethylhexyl) peroxydicarbonate, t-hexyl peroxyneodecanoate, t-butyl peroxyneodecanoate, t-butyl peroxyneoheptanoate, t-hexyl peroxypivalate, t-butyl peroxypivalate, di(3,5,5-trimethylhexanoyl) peroxide, dilauroyl peroxide, 1,1,3,3-tetramethylbutylperoxy-2-ethylhexanoate, disuccinic acid peroxide, 2,5-dimethyl-2,5-bis(2-ethylhexanoylperoxy) hexane, t-hexylperoxy-2-ethylhexanoate, di(4-methylbenzoyl) peroxide, dibenzoyl peroxide, t-butylperoxy-2-ethylhexyl carbonate, t-butylperoxyisopropyl carbonate, 1,6-bis(t-butylperoxycarbonyloxy) hexane, t-butylperoxy-3,5,5-trimethylhexanoate, t-butylperoxy acetate, t-butylperoxy benzoate, t-amylperoxy, 3,5,5-trimethylhexanoate, 2,2-bis (4,4-di-t-butylperoxycyclohexy) propane and 2,2-di-t-butylperoxybutane. Among them, dibenzoyl peroxide, t-butylperoxy-2-ethylhexyl carbonate and t-butylperoxyisopropyl carbonate are preferable. Further, a combination of two or more of these organic peroxides can be used. The organic peroxide may be an organic peroxide having a one-minute half-life temperature of 135° C. or lower.

The organic peroxide is used in various forms such as a solid form or a liquid form. The organic peroxide may be diluted into a liquid with a diluent or the like. In particular, organic peroxides in a form which can be mixed with an ester compound to be used in combination (particularly organic peroxides which are liquid at room temperature (25° C.)) are preferable because they can be more uniformly dispersed in P3HA, so that local degeneration reaction in the resin composition is easily suppressed.

From the viewpoint of enhancing dispersibility in P3HA, the ester compound is preferably an ester compound which is liquid at room temperature (25° C.). The ester compound which is liquid at room temperature is preferably an ester compound having a melting point of, for example, 20° C. or lower.

A method for obtaining a poly(3-hydroxyalkanoate) composition using an organic peroxide is disclosed in, for example, U.S. Pat. No. 9,034,989. However, with the method in which poly(3-hydroxyalkanoate) and a peroxide are combined as disclosed specifically in the patent, an unreacted peroxide remains in the composition at a processing temperature equal to or lower than the thermal decomposition temperature of P3HA. The present inventors have found that when such a composition is subjected to molding, the remaining peroxide reacts, so that local gelation occurs, resulting in deterioration of moldability and the appearance of a molded article. Such a problem has been found to be noticeable particularly at the time of obtaining a film or sheet, which is a thin molded article, by inflation molding.

The amount of the organic peroxide used in the melt-kneading step is 0.01 to 0.6 parts by weight, preferably 0.05 to 0.4 parts by weight, more preferably 0.10 to 0.35 parts by weight based on 100 parts by weight of poly(3-hydroxyalkanoate). The amount of organic peroxide used may be 0.01 to 0.3 parts by weight. When the amount of the organic peroxide used is controlled to fall within the above-described range, the drawdown time/melt viscosity ratio of the resulting resin composition can be controlled to $3.5 \times 10^{-2}$ to $4.8 \times 10^{-2}$ (sec/[Pa·s]).

The poly(3-hydroxyalkanoate) to be used in the melt-kneading step may be the same as described above, but is preferably poly(3-hydroxyalkanoate) which has not been subjected to crosslinking treatment. Specific examples of the poly(3-hydroxyalkanoate) include those having a drawdown time/melt viscosity ratio of $1.8 \times 10^{-2}$ to $2.5 \times 10^{-2}$ (sec/[Pa·s]). Poly(3-hydroxyalkanoate) having such a drawdown time/melt viscosity ratio or a composition thereof itself has very poor inflation moldability (see, for example, comparative examples). Examples of the poly(3-hydroxyalkanoate) include those having a melt viscosity of 900 to 1800 (Pa·s) and those having a drawdown time of 20 to 35 (sec).

The amount of the poly(3-hydroxyalkanoate) used in the melt-kneading step can be appropriately set according to the content in the resin composition.

The ester compound to be used in the melt-kneading step may be the same as described above, and the amount of the ester compound used can be appropriately set according to the content.

In the melt-kneading step, at least P3HA, an ester compound and an organic peroxide are introduced into an extruder, and melted and kneaded. In addition to these three components, other components such as a crystal nucleating agent, an external lubricant and an organic or inorganic filler as described above may also be introduced into the extruder, and melted and kneaded together with the three components. However, in the present invention, it is preferable to perform melt-kneading without adding a crosslinking agent having two or more radical-reactive functional groups (e.g. an epoxy group or a carbon-carbon double bond).

In the melt-kneading step, P3HA, the ester compound and the organic peroxide may be introduced into the extruder separately, or introduced into the extruder after the respective components are mixed. In particular, it is preferable that a mixture obtained by mixing the organic peroxide with the ester compound. and P3HA are separately introduced into the extruder. With such an introduction method, the dispersibility of the organic peroxide is improved, so that foreign matters are hardly generated in the resulting molded article.

Melt-kneading in the melt-kneading step can be performed in accordance with a known and conventional method, and for example, the melt-kneading can be performed using an extruder (single-screw extruder or twin-screw extruder), a kneader or the like. The conditions for the melt-kneading are not particularly limited, and can be appropriately set, but it is preferable to set a resin temperature and a retention time which allow the organic peroxide to complete reaction during melt-kneading. Specifically, it is preferable that melt-kneading is performed at a resin temperature of 155° C. or higher and 175° C. or lower as measured with a thermometer on a die. In addition, it is preferable to perform melt-kneading in such a manner that the retention time in the extruder is 60 seconds or more and 300 seconds or less. The resin temperature and the retention time are affected by the set temperature, the screw rotational speed and the screw configuration of the extruder. It is preferable that for example, a barrel zone in which an extruder barrel set temperature is 150 to 180° C. is provided in at least half of the extruder, and the screw rotational speed is set to 80 to 200 rpm so that the retention time is 60 seconds or more at a resin temperature of 170° C., or the retention time is 60 seconds or more at a resin temperature of 160° C. On the other hand, when the resin temperature is higher than 180° C., degradation of poly(3-hydroxyalkanoate) may be accelerated, and therefore it is preferable that for example, a barrel zone in which the extruder barrel set temperature is 180° C. or lower is provided in at least half of the extruder so that the retention time is not 60 seconds or more at a resin temperature of 180° C. It is preferable to reduce cutting failure or adhesion of pellets resulting from insufficient solidification by setting the die set temperature to, for example, 140 to 150° C. in order to facilitate pelletization of resin from the die (e.g. pelletization by strand cutting, underwater cutting, etc.).

The resin composition of the present invention is obtained by performing melt-kneading, and by further molding (molding-processing) the resin composition, various molded articles (molded articles obtained by molding the resin composition of the present invention) can be obtained. The method for molding and the molded article are not particularly limited, and in particular, since the resin composition of the present invention is excellent in inflation moldability, preferred examples include films or sheets produced by inflation molding. The thickness of the film or sheet is not particularly limited, and can be appropriately selected from the range of, for example, 10 to 100 μm. Examples of other molded articles include containers such as bottles produced by blow molding, and containers formed by vacuum molding.

The inflation molding refers to a method for molding a film in which a molten resin is extruded in a tubular form from an extruder having a cylindrical die attached to the tip thereof, and immediately thereafter, a gas is injected into the tube to expand the tube in a balloon form, whereby a film is molded. The method for inflation molding is not particularly limited, and it is possible to carry out the method using a general inflation molding machine which is used for molding a thermoplastic resin into a film. The general inflation molding machine is one having a cylindrical die attached to a single-screw extruder. The single-screw extruder may be one in which an introduced raw material resin is melted and kneaded, and discharged at a certain rate while being kept at a desired temperature. The screw shape or the like of the single-screw extruder is not particularly limited, but one including a mixing element is preferable from the viewpoint of kneading properties. Further, the structure of the cylindrical die is not particularly limited, but in particular, a spiral mandrel die is preferable because generation of welds is small and the thickness is easily made uniform.

The molding temperature in inflation molding is not particularly limited as long as the resin can be appropriately melted, but, for example, the molding temperature is preferably 135 to 200° C. The molding temperature mentioned here refers to a resin temperature after the resin is introduced into the extruder and before the resin is discharged from the die. In general, the resin temperature can be measured by, for example, a thermometer installed on an adapter.

The take-up speed in inflation molding is determined by the film thickness, width and the amount of resin discharged, and can be adjusted within a range over which balloon stability can be maintained. In general, the take-up speed is preferably 1 to 50 m/min.

In inflation molding, an air ring sprayed from the outside of the balloon is used for solidifying the discharged molten resin to stabilize the balloon. An air ring spraying structure that is suitably used is a slit-type structure in which a plurality of annular slits through which air is sprayed is provided, and stabilization of the balloon is promoted by chambers between the slits.

EXAMPLES

Hereinafter, the present invention will be described in more detail on the basis of examples, but the present invention is not limited to these examples.

The following raw materials were used in examples.

(P3HA)

A-1: Poly(3-hydroxybutyrate-co-3-hydroxyhexanoate (P3HB3HH) obtained in accordance with the method described in WO 2013/147139 and having a 3-hydroxyhexanoate (3HH) content of 11.2 mol % and a weight average molecular weight, in terms of standard polystyrene, of 580,000 as measured by GPC A-2: P3HB3HH obtained in accordance with the method described in WO 2008/010296 and having a 3HH content of 5.4 mol % and a weight average molecular weight, in terms of standard polystyrene, of 620,000 as measured by GPC A-3: EM5400F [poly(3-hydroxybutyrate-co-4-hydroxybutyrate) (P3HB4HB)] manufactured by Ecomann Co.

(Organic Peroxide)

B-1: NIPER NS (dibenzoyl peroxide, one-minute half-life temperature: 130° C.) manufactured by NOF CORPORATION B-2: Px L-40 RPS (dibenzoyl peroxide, one-minute half-life temperature: 130° C.) manufactured by KAYAKU AKZO CO., LTD.

B-3: KAYALENE 6-70 (1,6-bis(t-butyl-peroxycarbonyloxy)hexane), one-minute half-life temperature: 150° C.) manufactured by KAYAKU AKZO CO., LTD.

B-4: TRIGONOX 117 (tert-butylperoxy 2-ethylhexyl carbonate, one-minute half-life temperature: 156° C., melting point: −50° C.) manufactured by KAYAKU AKZO CO., LTD.

(Ester compound)

C-1: RIKEMAL PL-012 (glycerol diacetomonolaurate) manufactured by Riken Vitamin Co., Ltd.

C-2: DAIFATTY101 (mixed dibasic acid ester) manufactured by DAIHACHI CHEMICAL INDUSTRY CO., LTD.

In examples and comparative examples, evaluation was performed as follows.

[Melt Viscosity]

Using a capillary rheometer manufactured by Shimadzu Corporation, a molten resin composition was extruded at a volume flow rate (Q) of 0.716 cm$^3$/min and a shear rate of 122 sec$^{-1}$ from an orifice having a radius (d) of 0.05 cm and a capillary length (l) of 1 cm and connected to the tip of a barrel having a barrel set temperature of 170° C. and a radius (D) of 0.4775 cm, and a load (F) was measured. An apparent melt viscosity (η) was calculated from the following formula (1).

[Mathematical Formula 3]

$$\eta = \frac{\pi(F/\pi D^2)d^4}{8Ql} \quad \text{(Formula 1)}$$

[Drawdown Time]

A time required for the molten resin to fall by 20 cm after being discharged from the orifice in measurement of the melt viscosity was measured, and defined as a drawdown time (DT).

When the melt fracture was large, and thus the molten resin was not stably discharged from the orifice, the drawdown time was indicated as "unmeasurable" in Tables 1 to 3.

[Stable-Molding Region]

As an index quantitatively indicating the range of processing conditions (take-up speed and processing temperature) selectable in production of a film by inflation molding with a certain level of productivity, the "stable-molding region" was calculated by the following method. The larger the "stable-molding region", the wider the range of selection of processing conditions, and the stable-molding region serves as an index of mold-workability at an industrial level where fine adjustment of processing conditions is generally difficult. In this evaluation, an inflation molding machine was used in which a die equipped with a cylindrical die slip having a diameter of 100 mm is connected to an extruder having a single-screw of L/D=32 (manufactured by HOKUSHIN SANGYO CO., LTD.).

(1) First, an extrusion set temperature of 130 to 160° C., an adaptor and die set temperature (resin temperature) of 165° C. and a take-up speed of 3 m/min were set to initial conditions, and a film was produced by inflation molding of the resin composition. A screw rotational speed of 12 rpm and a die gap of 1 mm were set to extrusion conditions, and after extrusion, the film was produced in the following manner: a balloon was taken up at a take-up speed (initial take-up speed) of 3 m/min with a cooling roll adjusted to 40° C. while cooling air adjusted to 30° C. was applied to the balloon, whereby a balloon expanded to a blowup ratio of 2.7 (final folding width: 420 mm) was prepared. Thereafter, the take-up speed was increased in stages by 0.5 m/min for each stage until the balloon became unstable (rated "poor") in the following balloon stability evaluation, and the range of take-up speeds at which it was possible to stably perform inflation molding at a resin temperature of 165° C. was determined.

(Balloon Stability Evaluation)

"good": The variation in folding width is less than 20 mm per 20 m of the length of the obtained film.

"poor": The variation in folding width is 20 mm or more per 20 m of the length of the obtained film, or a film cannot be taken due to breakage or extreme deformation of the balloon.

When a balloon-shaped molded film extruded from a die caused to pass through a cooling roll, so that the film is folded to form a twofold film, the folding width is a width of the twofold film. When variation in folding width increases, the variation in thickness accordingly increases, so that it is difficult to maintain the cylindrical shape (that is, it is difficult to stably form a balloon).

(2) Next, the adapter and die set temperature (resin temperature) was increased by 2 to 3° C., the take-up speed was set to 3 m/min, inflation molding was performed in the same manner as described in (1). As in the case where the resin temperature was 165° C., the take-up speed was increased in stages by 0.5 m/min for each stage, and the range of take-up speeds at which it was possible to stably perform inflation molding was determined.

(3) Further, the operation (2) was repeated until the balloon became unstable (rated "poor") in the above-described balloon stability evaluation even when the take-up speed was 3 m/min.

The results of balloon stability evaluation ("good" or "poor") under the conditions of a resin temperature of 165° C. or higher and a take-up speed of 3 m/min or more as determined in the above operation are shown in a graph where the abscissa represents the resin temperature (° C.) and the ordinate represents the take-up speed (line speed) (m/min) as shown in the FIGURE. In the graph, the largest area formed by connecting the circles was calculated as the "stable-molding region" (° C.·m/min). The area is shown in Table 1. The FIGURE shows an example in which the stable-molding region is 15 (° C.·m/min).

When the balloon was unstable (rated "poor") at a resin temperature of 165° C. and a take-up speed of 3 m/min, the stable-molding region was set to 0° C.·m/min.

[Bleeding of Ester Compound]

The film obtained by inflation molding was left standing in a thermohygrostat chamber at a temperature of 23° C. and a humidity of 50% for 3 months, and bleeding of the ester compound was examined. Bleeding was evaluated in accordance with the following criteria on the basis of direct touch with a finger, and whether a line drawn immediately after molding with an oil-based marker pen "Mckee" manufactured by ZEBRA Co., Ltd. was blurred or not.

"Good": the film surface does not give a liquid feeling when touched with a finger, and there is no blur of ink.

"Poor": the film surface gives a liquid feeling when touched with a finger, or there is a blur of ink.

[Extreme Gelation During Molding]

Extreme gelation during inflation molding was evaluated in accordance with the following criteria.

"Good": A stable balloon can be prepared without being perforated by gel, and the average number of fisheyes having a size of more than 1 cm is 1 or less in 10 films randomly cut out in a size of 30 cm×30 cm.

"Poor": Gel causes perforation, and a stable balloon cannot be produced. Alternatively, the average number of fisheyes having a size of more than 1 cm is 2 or more in 10 films randomly cut out in a size of 30 cm×30 cm.

Example 1

(Method for Producing Resin Composition) P3HA (A-1), an organic peroxide (B-1) and an ester compound (C-1) were dry-blended at the blending ratio shown in Table 1, the mixture was melted and kneaded at a set temperature of 120 to 160° C. and a screw rotational speed of 100 rpm in a co-directional meshing-type twin-screw extruder (TEM 26ss manufactured by Toshiba Machine Co., Ltd.), and the strand was cut to obtain a resin composition. Table 1 shows the resin temperatures measured with a die thermometer. Further, in Table 1, the time until the resin composition is discharged from the die after each material is introduced into the extruder is shown as the retention time.

Table 1 shows the melt viscosity ($\eta$), the drawdown time (DT), and the ratio DT/$\eta$ of the obtained resin composition.

(Formation of Film)

Using the obtained resin composition, an inflation film was formed by the method described above in the section "Stable-molding region", and the stable-molding region was evaluated. The evaluation results are shown in Table 1. In the obtained film, the ester compound did not bleed, and extreme gelation did not occur.

Examples 2 to 4

Except that the blending amount of the ester compound or the type of the ester compound was changed as shown in Table 1, the same procedure as in Example 1 was carried out to produce a resin composition, and the melt viscosity ($\eta$), the drawdown time (DT), the ratio DT/$\eta$, the resin temperature and the retention time were evaluated. Further, an inflation film was in the same manner as in Example 1, and evaluated for the stable-molding region, bleeding of the ester compound bleeding and extreme gelation. The evaluation results are shown in Table 1.

Comparative Examples 1 to 6

Except that the blending amount of the organic peroxide or the ester compound was changed as shown in Table 1, the same procedure as in Example 1 was carried out to produce a resin composition, and the melt viscosity ($\eta$), the drawdown time (DT), the ratio DT/$\eta$, the resin temperature and the retention time were evaluated. Further, an inflation film was in the same manner as in Example 1, and evaluated for the stable-molding region, bleeding of the ester compound bleeding and extreme gelation. The evaluation results are shown in Table 1.

Examples 5 to 9

Except that the type or the blending amount of the organic peroxide was changed as shown in Table 2, the same procedure as in Example 1 was carried out to produce a resin composition, and the melt viscosity ($\eta$), the drawdown time (DT), the ratio DT/$\eta$, the resin temperature and the retention time were evaluated. Further, an inflation film was in the same manner as in Example 1, and evaluated for the stable-molding region, bleeding of the ester compound bleeding and extreme gelation. The evaluation results are shown in Table 2.

Comparative Examples 7 to 13

Except that the type or the blending amount of the organic peroxide or the blending amount of the ester compound was changed as shown in Table 2, the same procedure as in Example 1 was carried out to produce a resin composition, and the melt viscosity ($\eta$), the drawdown time (DT), the ratio DT/$\eta$, the resin temperature and the retention time were evaluated. Further, an inflation film was in the same manner as in Example 1, and evaluated for the stable-molding region, bleeding of the ester compound bleeding and extreme gelation. The evaluation results are shown in Table 2.

Examples 10 and 11

Except that the type of P3HA was changed as shown in Table 3, the same procedure as in Example 1 was carried out to produce a resin composition, and the melt viscosity ($\eta$), the drawdown time (DT), the ratio DT/$\eta$, the resin temperature and the retention time were evaluated. Further, an inflation film was in the same manner as in Example 1, and evaluated for the stable-molding region, bleeding of the ester compound bleeding and extreme gelation. The evaluation results are shown in Table 3.

Examples 12 to 13

Except that the type or the blending amount of the organic peroxide was changed as shown in Table 4, the same procedure as in Example 1 was carried out to produce a resin composition, and the melt viscosity ($\eta$), the drawdown time (DT), the ratio DT/$\eta$, the resin temperature and the retention time were evaluated. Further, an inflation film was in the same manner as in Example 1, and evaluated for the stable-molding region, bleeding of the ester compound bleeding and extreme gelation. The evaluation results are shown in Table 4.

TABLE 1

|  |  | Example 1 | Example 2 | Example 3 | Example 4 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|
| P3HA | A-1 | 100 | 100 | 100 | 100 | 100 | 100 | 100 | 100 | 100 | 100 | 100 |
|  | A-2 |  |  |  |  |  |  |  |  |  |  |  |
|  | A-3 |  |  |  |  |  |  |  |  |  |  |  |

TABLE 1-continued

|  |  | Example 1 | Example 2 | Example 3 | Example 4 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|
| Organic peroxide (pure content) | B-1 | 0.13 | 0.13 | 0.13 | 0.13 |  |  |  |  | 0.13 | 0.13 | 0.13 |
|  | B-2 |  |  |  |  |  |  |  |  |  |  |  |
|  | B-3 |  |  |  |  |  |  |  |  |  |  |  |
|  | B-4 |  |  |  |  |  |  |  |  |  |  |  |
| Ester compound | C-1 | 5 | 10 | 15 |  |  | 5 | 10 | 15 |  | 2 | 17 |
|  | C-2 |  |  |  | 10 |  |  |  |  |  |  |  |
| Melt viscosity [η] | Pa·s | 1350 | 1029 | 1013 | 1000 | 1444 | 1080 | 999 | 956 | 1800 | 1750 | 950 |
| Drawdown time [DT] | sec | 53 | 44 | 40 | 44 | 26 | 27 | 24 | 22 | 58 | 57 | 39 |
| DT/η | sec/[Pa·s] | 3.9E-02 | 4.3E-02 | 3.9E-02 | 4.4E-02 | 1.8E-02 | 2.5E-02 | 2.4E-02 | 2.3E-02 | 3.2E-02 | 3.3E-02 | 4.1E-02 |
| Stable molding region where molding is stable at a linear speed of 3 m/min or more and a Tm of 165° C. or higher. | °C.·m/min | 2 | 13 | 3 | 13 | 0 | 0 | 0 | 0 | 0 | 0 | 0 |
| Bleeding of ester compound |  | Good | Good | Good | Good | Good | Good | Good | Good | Good | Good | Poor |
| Extreme gelation during molding |  | Good | Good | Good | Good | Good | Good | Good | Good | Poor | Poor | Good |
| Resin temperature | °C. | 164 | 162 | 155 | 162 | 163 | 160 | 158 | 153 | 167 | 165 | 154 |
| Retention time | sec | 80 | 80 | 80 | 80 | 80 | 80 | 80 | 80 | 80 | 80 | 80 |

TABLE 2

|  |  | Example 5 | Example 6 | Example 7 | Example 8 | Example 9 | Comparative Example 8 | Comparative Example 9 | Comparative Example 10 | Comparative Example 11 | Comparative Example 12 | Comparative Example 13 |
|---|---|---|---|---|---|---|---|---|---|---|---|---|
| P3HA | A-1 | 100 | 100 | 100 | 100 | 100 | 100 | 100 | 100 | 100 | 100 | 100 |
|  | A-2 |  |  |  |  |  |  |  |  |  |  |  |
|  | A-3 |  |  |  |  |  |  |  |  |  |  |  |
| Organic peroxide (pure content) | B-1 | 0.19 | 0.25 | 0.06 | 0.13 | 0.25 | 0.06 | 0.13 | 0.25 | 0.38 | 0.65 | 0.25 |
|  | B-2 |  |  |  |  |  |  |  |  |  |  |  |
|  | B-3 |  |  |  |  |  |  |  |  |  |  |  |
|  | B-4 |  |  |  |  |  |  |  |  |  |  |  |
| Ester compound | C-1 | 10 | 10 | 10 | 10 | 10 |  |  |  |  | 10 |  |
|  | C-2 |  |  |  |  |  |  |  |  |  |  |  |
| Apparent melt viscosity [η] | Pa·s | 1125 | 1294 | 959 | 1027 | 1263 | 1617 | 1674 | 1913 | 1983 | 1910 | 774 |
| Drawdown time [DT] | sec | 53 | 58 | 34 | 45 | 57 | 44 | (54) | Unmeasurable | Unmeasurable | Unmeasurable | Unmeasurable |
| DT/η | sec/[Pa·s] | 4.7E-02 | 4.5E-02 | 3.5E-02 | 4.4E-02 | 4.5E-02 | 2.7E-02 | 3.2E-02 | — | — | — | — |
| Stable-molding region where molding is stable at a linear speed of 3 m/min or more and a Tm of 165° C. or higher. | °C.·m/min | 7 | 4 | 8 | 13 | 4 | 0 | 0 | 0 | 0 | 0 | 0 |
| Bleeding of ester compound |  | Good | Good | Good | Good | Good | Good | Good | Good | Good | Good | Good |
| Extreme gelation during molding |  | Good | Good | Good | Good | Good | Good | Good | Poor | Poor | Poor | Poor |
| Resin temperature | °C. | 162 | 162 | 162 | 162 | 164 | 167 | 167 | 168 | 172 | 163 | 168 |
| Retention time | sec | 80 | 80 | 80 | 80 | 80 | 80 | 80 | 80 | 80 | 80 | 80 |

55

TABLE 3

|  |  | Example 10 | Example 11 |
|---|---|---|---|
| P3HA | A-1 |  |  |
|  | A-2 | 100 |  |
|  | A-3 |  | 100 |
| Organic peroxide (pure content) | B-1 | 0.13 | 0.13 |
|  | B-2 |  |  |

TABLE 3-continued

|  |  | Example 10 | Example 11 |
|---|---|---|---|
|  | B-3 |  |  |
|  | B-4 |  |  |
| Ester compound | C-1 | 10 | 10 |
|  | C-2 |  |  |
| Apparent melt viscosity [η] | Pa · s | 1000 | 1550 |
| Drawdown time [DT] | sec | 44 | 54 |
| DT/η | sec/[Pa · s] | 4.4E−02 | 3.5E−02 |
| Stable-molding region where molding is stable at a linear speed of 3 m/min or more and a Tm of 165° C. or higher. | ° C. · m/min | 20 | 10 |
| Bleeding of ester compound |  | Good | Good |
| Extreme gelation during molding |  | Good | Good |
| Resin temperature | ° C. | 163 | 162 |
| Retention time | sec | 80 | 80 |

TABLE 4

|  |  | Example 12 | Example 13 |
|---|---|---|---|
| P3HA | A-1 | 100 | 100 |
|  | A-2 |  |  |
|  | A-3 |  |  |
| Organic peroxide | B-1 |  |  |
| (pure content) | B-2 |  |  |
|  | B-3 |  |  |
|  | B-4 | 0.25 | 0.30 |
| Ester compound | C-1 | 10 | 10 |
|  | C-2 |  |  |
| Apparent melt viscosity [η] | Pa · s | 984 | 956 |
| Drawdown time [DT] | sec | 38 | 43 |
| DT/η | sec/[Pa · s] | 3.9E−02 | 4.5E−02 |
| Stable-molding region where molding is stable at a linear speed of 3 m/min or more and a Tm of 165° C. or higher. | ° C. · m/min | 8 | 13 |
| Bleeding of ester compound |  | Good | Good |
| Extreme gelation during molding |  | Good | Good |
| Resin temperature | ° C. | 162 | 162 |
| Retention time | sec | 80 | 80 |

The invention claimed is:

1. A resin composition, comprising:
   100 parts by weight of poly(3-hydroxyalkanoate); and
   5 to 15 parts by weight of an ester compound,
   wherein a ratio of a melt viscosity (Pa·s) to a drawdown time (sec) of the resin composition is from $4.0 \times 10^{-2}$ to $4.7 \times 10^{-2}$ (sec/[Pa·s]),
   wherein the melt viscosity is an apparent melt viscosity (η) calculated from the following formula (1), wherein F is a load measured with a capillary rheometer in extrusion of the resin composition molten at a volume flow rate (Q) of 0.716 cm³/min and a shear rate of 122 sec$^{-1}$ from an orifice having a radius (d) of 0.05 cm and a capillary length (l) of 1 cm and connected to the tip of a barrel having a barrel set temperature of 170° C. and a radius (D) of 0.4775 cm, and the drawdown time is a time required for the resin composition to fall by 20 cm after being discharged from the orifice in measurement of the melt viscosity:

$$\eta = \frac{\pi (F/\pi D^2) d^4}{8Ql}.$$  Formula 1

2. The resin composition according to claim 1, wherein the melt viscosity is from 800 to 1600 (Pa·s).

3. The resin composition according to claim 1, wherein the drawdown time is from 30 to 60 (sec).

4. The resin composition according to claim 1, wherein the ester compound has no radical-reactive functional group.

5. The resin composition according to claim 1, wherein the poly(3-hydroxyalkanoate) is at least one selected from the group consisting of poly(3-hydroxybutyrate-co-3-hydroxyvalerate), poly(3-hydroxybutyrate-co-3-hydroxyhexanoate), poly(3-hydroxybutyrate-co-3-hydroxyvalerate-co-3-hydroxyhexanoate), poly(3-hydroxybutyrate-co-4-hydroxybutyrate), poly(3-hydroxybutyrate-co-3-hydroxyoctanoate) and poly(3-hydroxybutyrate-co-3-hydroxydecanoate).

6. The resin composition according to claim 1, wherein the ester compound is at least one selected from the group consisting of a glycerin ester-based compound, a dibasic acid ester-based compound, an adipate ester-based compound, a polyether ester-based compound and an isosorbide ester-based compound.

7. A molded article obtained by molding the resin composition of claim 1.

8. The molded article according to claim 7, wherein the molded article is a film or a sheet.

9. The molded article according to claim 7, wherein the molded article is a film having a thickness of 30 μm or less.

10. A method for producing the resin composition of claim 1, the method comprising:

melting and kneading 100 parts by weight of poly(3-hydroxyalkanoate) from 5 to 15 parts by weight of an ester compound having no radical-reactive functional group and from 0.01 to 0.6 parts by weight of an organic peroxide at a resin temperature of from 155° C. to 175° C.

11. The method according to claim 10, wherein the melting and kneading is performed such that the mixture is retained in an extruder for 60 seconds to 300 seconds.

12. A method for producing a film or a sheet, comprising:
    forming a film or a sheet by subjecting the resin composition of claim 1 to inflation molding.

13. The resin composition according to claim 1, wherein the poly(3-hydroxyalkanoate) has a weight average molecular weight of from 50,000 to 3,000,000.

14. The resin composition according to claim 1, further comprising:
    250 parts by weight or less of a biodegradable resin other than the poly(3-hydroxyalkanoate).

15. The resin composition according to claim 1, comprising from 8 to 11 parts by weight of the ester compound.

16. The resin composition according to claim 1, which is obtained by melting and kneading 100 parts by weight of the poly(3-hydroxyalkanoate), from 0.01 to 0.6 parts by weight of an organic peroxide and from 5 to 15 parts by weight of the ester compound in an extruder.

* * * * *